United States Patent [19]

Yonts

[11] Patent Number: 4,842,236

[45] Date of Patent: Jun. 27, 1989

[54] SPRING-LOADED TIEDOWN APPARATUS FOR BOATS, CAMPERS AND OTHER CARGO

[76] Inventor: James T. Yonts, 6147 Rhythm Cir., Orlando, Fla. 32808

[21] Appl. No.: 39,967

[22] Filed: Apr. 16, 1987

[51] Int. Cl.$^4$ .............................................. B65D 63/00
[52] U.S. Cl. .................................... 248/499; 248/500
[58] Field of Search ............... 248/499, 500, 505, 352, 248/578, 579, 600, 610; 292/DIG. 43, 339; 224/309, 314, 318; 410/100, 116

[56] References Cited

U.S. PATENT DOCUMENTS

| | | | |
|---|---|---|---|
| 250,692 | 12/1881 | Vance | 248/579 |
| 1,088,028 | 2/1914 | Johnston | 248/600 X |
| 3,011,818 | 12/1961 | Matthiessen | 248/499 X |
| 3,047,326 | 7/1962 | Leslie et al. | 292/DIG. 43 X |
| 3,416,759 | 12/1968 | Arnett | 248/499 X |
| 3,480,241 | 11/1969 | Moyer | 248/499 X |
| 4,340,329 | 7/1982 | Ericsson | 410/100 |

FOREIGN PATENT DOCUMENTS

| | | | |
|---|---|---|---|
| 240092 | 11/1945 | Switzerland | 410/100 |
| 12989 | of 1911 | United Kingdom | 248/500 |
| 343765 | 2/1931 | United Kingdom | 248/499 |

Primary Examiner—Robert W. Gibson, Jr.
Assistant Examiner—Karen J. Chotkowski

[57] ABSTRACT

A spring loaded tiedown apparatus for boats, campers and other cargo, particularly when transporting same upon a trailer or atop a motor vehicle. This tiedown apparatus is comprised of a strap portion which is attached to the sides of a trailer or other motor vehicle by fastening means such as hooks. The strap portion has buckle means of adjusting the length of the apparatus to fit various sizes of cargo. An enclosed spring-loaded mechanism is also provided which maintains the same tension on the cargo throughout transport. In one preferred embodiment, the spring mechanism consists of two interconnected concentric covers which expand in or out of each other as the spring is extended or depressed. Other embodiments show the spring mechanism with one enclosure or without any covers. By being enclosed, the spring mechanism does not scratch or damage the cargo. A handle or foot pedal connected to an extension hook on the spring mechanism enables the user to apply pressure when installing the apparatus, thereby making it safe and easy to use.

1 Claim, 1 Drawing Sheet

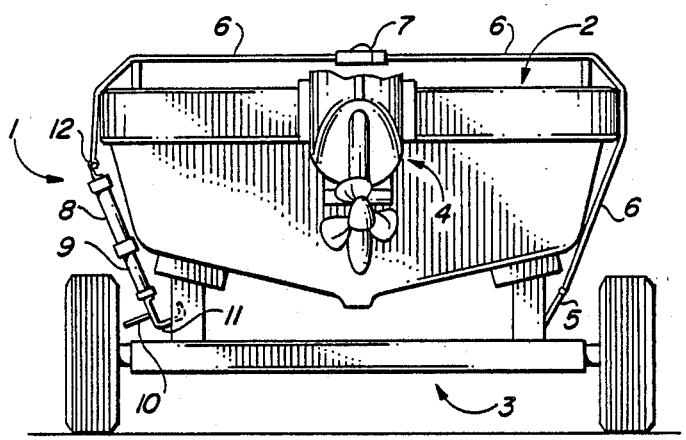
FIG.-1
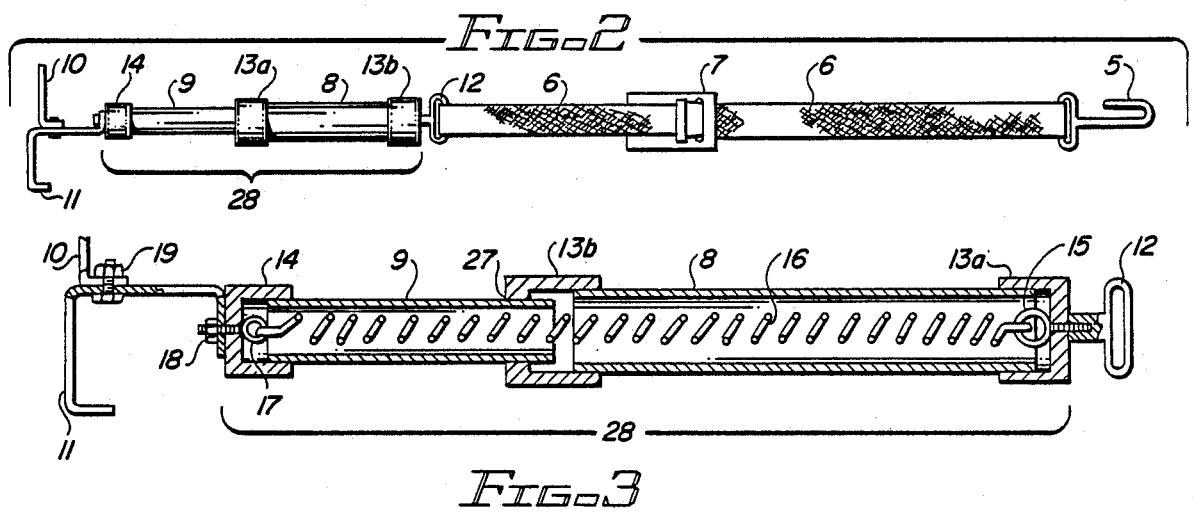
FIG.-2
FIG.-3
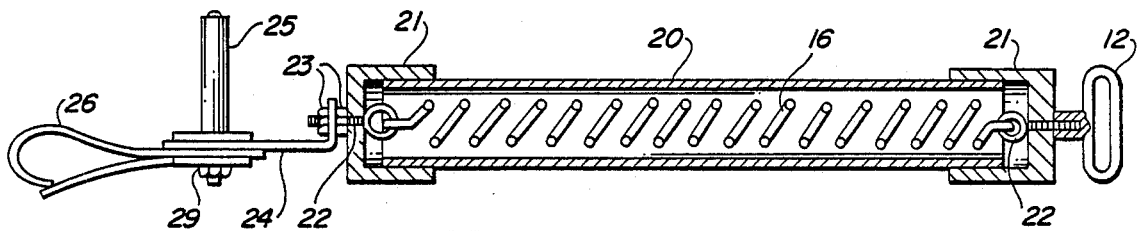
FIG.-4
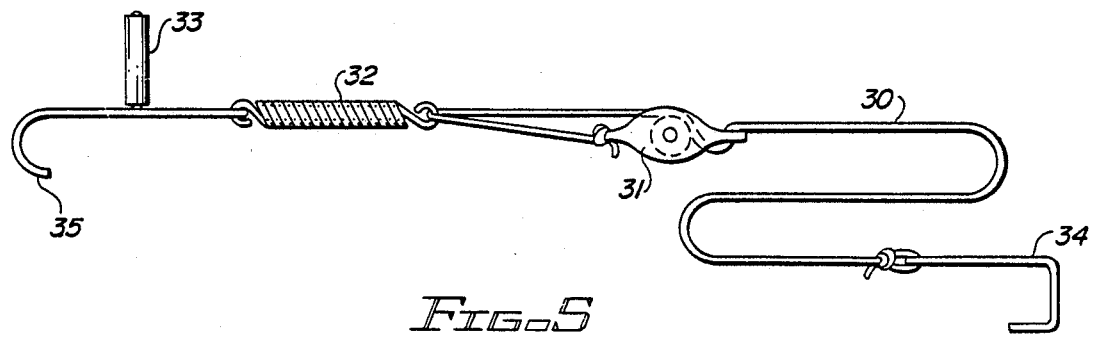
FIG.-5

4,842,236

SPRING-LOADED TIEDOWN APPARATUS FOR BOATS, CAMPERS AND OTHER CARGO

BACKGROUND OF THE INVENTION

This invention relates generally to brackets and tiedown devices, and more particularly to tiedown devices for carrying boats, campers and other cargo on motor vehicles.

When moving various types of cargo aboard a vehicle or trailer, particularly in the case of a boat, it becomes necessary to properly secure such cargo to the vehicle or trailer to avoid losing same during transport. Heretofore such cargo was secured by ropes or spring cords which, unfortunately, come loose with jarring and are not adjustable to fit various sizes of cargo.

The prior art teaches some tiedowns for various items. For instance, U.S. Pat. No. 3,416,759 by Arnett shows an adjustable strap with spring tiedown to hold an outboard motor in place on a boat. U.S. Pat. No. 3,018,818 by Matthiessen shows an automobile trunk holder that uses spring-loaded hooks at both ends. Still other patents such as U.S. Pat. No. 1,506,649 by Lotte shows spring-loaded flexible straps to hold down articles.

Although the aforereferenced patented tiedown apparatuses could be used to tie down cargo or boats, none could do it as well or in the same manner as Applicant's invention. Applicant's invention provides a tiedown device which does not unhook or loosen with jarring, but rather provides the same amount of tension on the cargo at all times during transport. Furthermore, the device eliminates damage to the cargo being carried by using soft straps or rope along the length of the cargo and by enclosing the spring mechanism. Furthermore, unlike many prior tiedown devices, the instant tiedown device is adjustable to fit almost any size of cargo and can be easily and safely installed by hand or foot, thereby eliminating injuries which occur with other tiedown devices.

Thus, as outlined above, this invention provides a useful, novel and non-obvious tiedown apparatus which has numerous advantages over prior tiedowns.

SUMMARY OF THE INVENTION

The primary object of this invention is to provide a tiedown which securely fastens cargo, particularly boats, without losing tension or coming undone during transport of the cargo.

A second object of the invention is to provide a tiedown device which does not damage or scratch the cargo or boat.

Another object of the invention is to provide such a tiedown device which is adjustable to fit many sizes of boats and other cargo.

An even further object of the invention is to provide a tiedown device which is safe to install, being designed so as to decrease the possibility of injury to the user.

Another object of this invention is to provide a tiedown device which is quick and easy to install.

The instant invention accomplishes the above-referenced objects as well as others by providing a tiedown made of soft straps, preferrably of cloth, with means of adjusting the length of the tiedown, to fit the size of the cargo. At one end of the straps is attached a hook, which attaches to one side of the trailer or vehicle carrying a boat or cargo. At the opposite end of the straps is a spring mechanism and a hook for attaching the tiedown to the other side of the trailer or vehicle. A handle-like extension in this end can be pushed by hand or foot to stretch the spring until the hook attaches to the other side of the trailer or vehicle. In this manner, the spring provides the same tension on the cargo at all times. The spring mechanism may be enclosed, preferrably in plastic, so as not to scratch the boat finish or damage the cargo. By enclosing the spring and providing the handle makes Applicant's invention provide a tiedown device which is safer, faster and easier to install than prior tiedowns.

Other objects, advantages and features of this invention will become readily apparent from the following detailed description of the specific embodiments thereof when read in conjunction with the accompanying drawings.

BRIEF DESCRIPTION OF THE DRAWINGS

The drawings appended to this application are as follows:

FIG. 1 is an elevational view of this invention in use on a boat being carried on a trailer looking from the stern of the boat;

FIG. 2 is a top view of the invention with the spring portion and hooks turned sideways;

FIG. 3 is a detailed longitudinal cross-section view of the spring portion end of the device;

FIG. 4 is detailed longitudinal cross-section view of another embodiment of the spring portion end of the device.

FIG. 5 is a side view of another embodiment of the invention using ropes and an uncovered spring mechanism.

DESCRIPTION OF THE PREFERRED EMBODIMENTS

Referring now in detail to the drawings in FIG. 1, the invention generally indicated by the numeral 1 is depicted as it would appear from the stern when securing a boat 2 with the motor 4 to a trailer 3 during transport. The operation of the invention can be described at the same time as its components. First, a hook 5, which may be made of metal or plastic, is hooked onto the side of a trailer 3 or motor vehicle which is carrying the cargo, in this illustration a boat 2. A strap 6 is attached to the hook 5 and is placed over the side of the boat 2 until the hook 11 on the other side of the device reaches the other side. A spring section 28 is attached between the strap 6 and hook 11 by a strap loop 12. In turn, the strap loop 12 is attached to the other end of the exterior spring sleeve cover 8. Before securing the hook 11 on the other side of the trailer, the strap 6 is adjusted by use of the adjustment buckle 7. Once the length of the strap 6 is obtained to fit the boat 2, at the same time provide the necessary tension, the handle 10 may be depressed by hand or foot which, in turn, causes the interior spring sleeve cover 9 to extend outward from the exterior spring sleeve cover 8 until the hook 11 is secured on the trailer 3. With the exception of the straps, all hooks, buckles and spring coverings in this invention may be made of metal or plastic.

The invention is illustrated in more detail in the top view of the invention shown in FIG. 2 of the drawings. In FIG. 2, end caps 13a and 13b and spring end cap 14 are shown attached to the exterior spring sleeve 8 and interior spring sleeve cover 9, respectively. Although these latter end caps are illustrated in the drawings, this invention also contemplates that the spring sleeve covers 8 and 9 each can be made as on hollow piece, thereby eliminating the need for end caps.

Probably the most important part of the device, that is, the spring section 28 is shown in detail in the longitudinal cross-section of FIG. 3. Beginning from right to left of the spring section, the strap loop 12 which is secured to the exterior sleeve end cap 13b by screwing it on to an eye bolt 15 placed inside the end cap 13b. A spring 16 attaches to the eye hook 15 and the exterior sleeve cover 8 is placed over said spring 16. The second exterior sleeve end cap 13b is then placed over the spring 8. This exterior end cap 13a is just like the other exterior end cap 13b, except that it has a large outer hole or opening 27 so that the smaller spring sleeve cover 9 can be inserted into it and over the end of the spring 16. This interior sleeve cover 9 fits inside the larger exterior sleeve 8 when the spring 16 is at rest and the invention 1 is not being used. Finally, a second eye bolt 17 is attached to the end of the spring 16 and a cap 14 is secured over the end of the interior sleeve cover 9. This eye bolt 17 extends from the cap 14 to which a hook 11 is secured by a nut 18 or other fastening means. A handle 10 is provided on the opposite side of the hook 11 to allow safe and easy extension of the spring 16 when attaching the hook 11 to a carrier. This handle 10 may be secured to the hook 11 by nut and bolt combination 19 or made as one piece with the hook 11.

Although the preferred embodiment of the spring section 28 is shown in FIG. 3, a simpler and less expensive embodiment of the spring section is illustrated in FIG. 4. In this embodiment, there is no exterior or interior sleeve covers, but merely one cover 20 surrounding the spring 16. In this embodiment the spring 16 is not allowed to stretch as much as it can in the embodiment illustrated in FIG. 3. However, if the strap 6 itself is properly adjusted by use of the adjustment buckle 7, then a long extension of the spring 16 is not always necessary. This latter embodiment utilizes the same strap loop 12 and eye bolts 21 and 22 on each end extending through the end caps 21. A second embodiment of the hook portion is also shown in FIG. 3. In this embodiment a connector 24 is fastened to the eye bolt 22 between two nuts 23. The connector 24 is, in turn, attached to a hook 26 with oppositely extending handle 25 by nut 29.

An even further embodiment of the invention is shown in FIG. 5. This embodiment uses rope 30 rather than straps along its length. Moreover, a pulley 31 constitutes the means of adjustment rather than a buckle. The spring mechanism 32 is not covered or enclosed as in the other embodiments of the invention. The remaining components, the hooks 34 and 35 and handle 33 are essentially the same as in other embodiments. This embodiment of the invention would probably best be used for small cargo and where damage is not of concern to the user since the spring mechanism is uncovered.

As described in detail hereinabove, it should be apparent that there has been provided a tiedown device which has many advantages over the devices in the prior art. Among these advantages are that the instant tiedown device more securely fastens cargo such as boats by providing constant spring tension. This device also prevents damage to boat or other cargo by providing unique interconnected covers over the spring. Moreover, an adjustment buckle on the strap of this device makes it adjustable to fit almost any size of boat or other cargo. In summary, the instant invention provides a tiedown device which is better, quicker, easier and safer to install than anything in the prior art.

While specific embodiments of the invention have been described in detail hereinabove, it is to be understood that various modifications, such as the location of the spring mechanism, may be made from the specific details described hereinabove without departing from the spirit and scope of the invention as set forth in the appended claims.

I claim the following:

1. A tiedown apparatus for holding and securing a boat, camper or other cargo comprising:
   a first hook for attaching the tiedown apparatus to a trailer or other carrier:
   a second hook for attaching the other end of the tiedown apparatus to a trailer or other carrier; wherein said second hook includes a main portion and a hooking portion extending perpendicular to the main portion:
   a connection portion comprised of two straps interconnected by a buckle for adjusting the length of the tiedown apparatus:
   a spring mechanism between said first and second hooks on the connecting portion of the apparatus comprising a spring having two ends attached to the connecting portion on one end and the second hook on the other end enclosed partially in first cover which, in turn, is concentrically interconnected to a second cover having a smaller diameter than the first so as to allow said second cover to slide both inward and outward as the spring is extended or depressed;
   a handle or foot pedal connected to a side of the main portion opposite the hooking portion of second hook, said handle or foot pedal extending outward so that the user can apply downward pressure to extend the spring mechanism when attaching or detaching the tiedown apparatus;
   said second hook further comprising an offset portion extending outwardly from the main portion on a side opposite the hooking portion wherein the other end of the spring is attached to the offset portion a distance spaced from the main portion of the second hook.

* * * * *